US006102797A

United States Patent [19]

Kail

[11] Patent Number: 6,102,797

[45] **Date of Patent: *Aug. 15, 2000**

[54] METHOD AND APPARATUS FOR CONDUCTING GAMES OF CHANCE

[75] Inventor: Gianni Kail, Turin, Italy

[73] Assignee: Supra Engineering Limited, Dublin, Ireland

[ * ] Notice: This patent is subject to a terminal disclaimer.

[21] Appl. No.: 08/950,243

[22] Filed: Oct. 14, 1997

Related U.S. Application Data

[63] Continuation-in-part of application No. 09/020,128, Feb. 6, 1998, Pat. No. 6,015,345.

[51] Int. Cl.[7] ...................................................... G06F 15/00

[52] U.S. Cl. ................................ 463/16; 463/17; 463/42; 273/138.1; 273/139; 273/269

[58] Field of Search ................................ 463/10, 16, 25, 463/41, 42, 17, 18, 22, 29; 283/48.1, 49; 273/138.1, 139, 274, 259, 269, 144 A, 144 R, 144 B

[56] References Cited

U.S. PATENT DOCUMENTS 4,033,588 7/1977 Watts ................................ 273/138 A
4,108,361 8/1978 Krause .................................. 273/139
4,429,877 2/1984 Coppock ................................ 273/139
4,540,174 9/1985 Coppock ............................ 273/138 R
4,764,666 8/1988 Bergeron ................................ 273/139
5,043,889 8/1991 Lucey ..................................... 364/412
5,110,129 5/1992 Alvarez .............................. 273/138 A
5,332,218 7/1994 Lucey ................................. 273/138 A
5,497,990 3/1996 Nanni ................................. 273/138 A
5,518,239 5/1996 Johnston ................................ 273/139
5,564,977 10/1996 Algie ........................................ 463/25
5,683,090 11/1997 Zeile et al. .............................. 273/269
5,687,968 11/1997 Tarantino ................................ 273/139
5,722,890 3/1998 Libby et al. ............................... 463/17
5,782,470 7/1998 Langan ................................... 273/139
5,791,990 8/1998 Schroder et al. .......................... 463/17
5,842,921 12/1998 Mindes et al. ............................ 463/16

FOREIGN PATENT DOCUMENTS 0677311 10/1995 European Pat. Off. .
2660207 10/1991 France .
09019535A 1/1997 Japan .
2028554 3/1980 United Kingdom .
2042980 10/1980 United Kingdom .
2262635 6/1993 United Kingdom .
2300956 11/1996 United Kingdom .

*Primary Examiner*—Valencia Martin-Wallace
*Assistant Examiner*—John M. Hotaling, II
*Attorney, Agent, or Firm*—Abelman, Frayne & Schwab

[57] ABSTRACT

A weekly or other regularly scheduled game of chance is conducted in conjunction with a series of seasonal sporting events, such as baseball, football, hockey and basketball games, in which a number of specific games are identified on a printed or electronic game card, and the participant marks the game card with the predicted total of points scored by both teams for each of the identified sporting events, which can include one or more alternate events. Data related to predicted scores and the fee paid are entered into a programmed central computer system for eventual processing and matching with data entered for the actual scores when the identified games are completed to identify the winners. The participant receives a receipt and unique transaction code. Participant data entry and payment means can include third-party ATMs and cash machines, and third-party vendors and participants' PCs connected to the central computer via the Internet, with payment made through the participants' credit or debit accounts.

29 Claims, 23 Drawing Sheets

1 BASKETBALL

| | GAMES | | PREDICTIONS | | | | | | | | | |
|---|---|---|---|---|---|---|---|---|---|---|---|---|
| | HOME | VISITOR | -180 | 180-185 | 186-190 | 191-195 | 196-200 | 201-205 | 206-210 | 211-215 | 216-220 | 220+ |
| 1 | NY Knicks | Hawks | ○ | ● | ○ | ○ | ○ | ○ | ○ | ○ | ○ | ○ |
| 2 | Indiana | Cleveland | ○ | ● | ○ | ○ | ○ | ○ | ○ | ○ | ○ | ○ |
| 3 | Toronto | Detroit | ○ | ○ | ○ | ○ | ○ | ● | ○ | ○ | ○ | ○ |
| 4 | Houston | LA Clippers | ○ | ○ | ○ | ○ | ○ | ○ | ● | ○ | ○ | ○ |
| 5 | Portland | Dallas | ○ | ○ | ○ | ○ | ● | ○ | ○ | ○ | ○ | ○ |
| 6 | Utah | Miami | ○ | ○ | ○ | ○ | ○ | ○ | ○ | ○ | ● | ● |
| 7 | Charlotte | Washington | ○ | ○ | ○ | ○ | ● | ○ | ○ | ○ | ○ | ○ |

| 1 | | | BASEBALL | | | | | | | | | | | | | | |
|---|---|---|---|---|---|---|---|---|---|---|---|---|---|---|---|---|---|
| GAMES | | | PREDICTIONS | | | | | | | | | | | | | | |
| | HOME | VISITOR | 1 | 2 | 3 | 4 | 5 | 6 | 7 | 8 | 9 | 10 | 11 | 12 | 13 | 14 | 15 | +15 |
| 1 | Orioles | Twins | O | O | O | O | O | O | O | O | O | O | O | O | O | O | O | O |
| 2 | Pirates | Giants | O | O | O | O | O | O | O | O | O | O | O | O | O | O | O | O |
| 3 | Royals | Blue Jays | O | O | O | O | O | O | O | O | O | O | O | O | O | O | O | O |
| 4 | Mets | Padres | O | O | O | O | O | O | O | O | O | O | O | O | O | O | O | O |
| 5 | Rangers | White Sox | O | O | O | O | O | O | O | O | O | O | O | O | O | O | O | O |
| 6 | Rockies | Astros | O | O | O | O | O | O | O | O | O | O | O | O | O | O | O | O |
| RESERVE | | | | | | | | | | | | | | | | | | |
| 7 | Brewers | Tigers | O | O | O | O | O | O | O | O | O | O | O | O | O | O | O | O |
| 8 | Yankees | Mariners | O | O | O | O | O | O | O | O | O | O | O | O | O | O | O | O |
| 9 | Braves | Reds | O | O | O | O | O | O | O | O | O | O | O | O | O | O | O | O |

Figure 2A

| 1 | | | BASEBALL | | | | | | | | | | | | | | |
|---|---|---|---|---|---|---|---|---|---|---|---|---|---|---|---|---|---|
| GAMES | | | PREDICTIONS | | | | | | | | | | | | | | |
| | HOME | VISITOR | 1 | 2 | 3 | 4 | 5 | 6 | 7 | 8 | 9 | 10 | 11 | 12 | 13 | 14 | 15 | +15 |
| 1 | Orioles | Twins | O | O | O | O | O | O | O | O | ● | O | O | O | O | O | O | O |
| 2 | Pirates | Giants | O | O | O | O | O | O | ● | O | O | O | O | O | O | O | O | O |
| 3 | Royals | Blue Jays | O | O | O | O | O | O | O | ● | O | O | ● | O | O | O | O | O |
| 4 | Mets | Padres | O | O | O | O | ● | O | O | O | O | O | O | O | O | O | O | O |
| 5 | Rangers | White Sox | O | O | O | O | O | O | O | O | O | O | ● | O | O | O | O | O |
| 6 | Rockies | Astros | O | O | O | O | O | O | ● | O | O | O | O | O | O | O | O | O |
| RESERVE | | | | | | | | | | | | | | | | | | |
| 7 | Brewers | Tigers | O | O | O | O | O | O | ● | ● | O | O | O | O | O | O | O | O |
| 8 | Yankees | Mariners | O | O | O | O | O | ● | O | O | O | O | O | O | O | O | O | O |
| 9 | Braves | Reds | O | O | O | O | O | O | ● | O | O | O | O | O | O | O | O | O |

Figure 2B

| 1 | | | | | | | | | | | | | | | | | | BASEBALL |
|---|---|---|---|---|---|---|---|---|---|---|---|---|---|---|---|---|---|---|
| GAMES | | | PREDICTIONS | | | | | | | | | | | | | | | |
| | HOME | VISITOR | 1 | 2 | 3 | 4 | 5 | 6 | 7 | 8 | 9 | 10 | 11 | 12 | 13 | 14 | 15 | +15 |
| 1 | Orioles | Twins | O | O | O | O | O | O | O | O | ● | O | O | O | O | O | O | O |
| 2 | Pirates | Giants | O | O | O | O | O | O | ● | O | O | O | O | O | O | O | O | O |
| 3 | Royals | Blue Jays | O | O | O | O | ● | O | O | ● | O | O | ● | O | O | O | O | O |
| 4 | Mets | Padres | O | O | O | O | ● | O | O | O | O | O | O | O | O | O | O | O |
| 5 | Rangers | White Sox | O | O | O | O | O | O | O | O | O | O | ● | O | O | O | O | O |
| 6 | Rockies | Astros | O | O | O | O | O | O | ● | O | O | O | O | O | O | O | O | O |
| RESERVE | | | | | | | | | | | | | | | | | | |
| 7 | Brewers | Tigers | O | O | O | O | O | O | ● | ● | O | O | O | O | O | O | O | O |
| 8 | Yankees | Mariners | O | O | O | O | O | ● | O | O | O | O | O | O | O | O | O | O |
| 9 | Braves | Reds | O | O | O | O | O | O | ● | O | O | O | O | O | O | O | O | O |

Figure 2C

1 BASEBALL

AMERICAN LEAGUE PLAYOFFS

Cleveland Indians vs. Baltimore Orioles

| GAMES | PREDICTIONS | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | +15 |
| Game 1 | O | O | O | O | O | O | O | O | O | O | O | O | O | O | O | O |
| Game 2 | O | O | O | O | O | O | O | O | O | O | O | O | O | O | O | O |
| Game 3 | O | O | O | O | O | O | O | O | O | O | O | O | O | O | O | O |
| Game 4 | O | O | O | O | O | O | O | O | O | O | O | O | O | O | O | O |
| Game 5 | O | O | O | O | O | O | O | O | O | O | O | O | O | O | O | O |

2 BASEBALL

AMERICAN LEAGUE PLAYOFFS

New York Yankees vs. Texas Rangers

| GAMES | PREDICTIONS | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | +15 |
| Game 1 | O | O | O | O | O | O | O | O | O | O | O | O | O | O | O | O |
| Game 2 | O | O | O | O | O | O | O | O | O | O | O | O | O | O | O | O |
| Game 3 | O | O | O | O | O | O | O | O | O | O | O | O | O | O | O | O |
| Game 4 | O | O | O | O | O | O | O | O | O | O | O | O | O | O | O | O |
| Game 5 | O | O | O | O | O | O | O | O | O | O | O | O | O | O | O | O |

3 BASEBALL

NATIONAL LEAGUE PLAYOFFS

St. Louis Cardinals vs. San Diego Padres

| GAMES | PREDICTIONS | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | +15 |
| Game 1 | O | O | O | O | O | O | O | O | O | O | O | O | O | O | O | O |
| Game 2 | O | O | O | O | O | O | O | O | O | O | O | O | O | O | O | O |
| Game 3 | O | O | O | O | O | O | O | O | O | O | O | O | O | O | O | O |
| Game 4 | O | O | O | O | O | O | O | O | O | O | O | O | O | O | O | O |
| Game 5 | O | O | O | O | O | O | O | O | O | O | O | O | O | O | O | O |

4 BASEBALL

NATIONAL LEAGUE PLAYOFFS

Atlanta Braves vs. Los Angeles Dodgers

| GAMES | PREDICTIONS | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | +15 |
| Game 1 | O | O | O | O | O | O | O | O | O | O | O | O | O | O | O | O |
| Game 2 | O | O | O | O | O | O | O | O | O | O | O | O | O | O | O | O |
| Game 3 | O | O | O | O | O | O | O | O | O | O | O | O | O | O | O | O |
| Game 4 | O | O | O | O | O | O | O | O | O | O | O | O | O | O | O | O |
| Game 5 | O | O | O | O | O | O | O | O | O | O | O | O | O | O | O | O |

Figure 3

| 1 | | | | | | | | | | | | | | | | | | BASEBALL |
|---|---|---|---|---|---|---|---|---|---|---|---|---|---|---|---|---|---|---|
| GAMES | | | PREDICTIONS | | | | | | | | | | | | | | | |
| | HOME | VISITOR | 1 | 2 | 3 | 4 | 5 | 6 | 7 | 8 | 9 | 10 | 11 | 12 | 13 | 14 | 15 | +15 |
| 1 | Orioles | Twins | ○ | ○ | ○ | ○ | ● | ○ | ○ | ○ | ○ | ○ | ○ | ○ | ○ | ○ | ○ | ○ |
| 2 | Pirates | Giants | ○ | ○ | ○ | ○ | ○ | ○ | ● | ● | ○ | ○ | ○ | ○ | ○ | ○ | ○ | ○ |
| 3 | Royals | Blue Jays | ○ | ○ | ○ | ● | ● | ○ | ○ | ○ | ○ | ○ | ○ | ○ | ○ | ○ | ○ | ○ |
| 4 | Mets | Padres | ○ | ○ | ○ | ○ | ○ | ○ | ● | ○ | ● | ○ | ● | ○ | ○ | ○ | ○ | ○ |
| 5 | Rangers | White Sox | ○ | ○ | ○ | ● | ● | ○ | ● | ○ | ● | ○ | ● | ○ | ○ | ○ | ○ | ○ |
| 6 | Rockies | Astros | ○ | ● | ● | ● | ● | ● | ● | ● | ● | ○ | ○ | ○ | ○ | ○ | ○ | ○ |
| RESERVE | | | | | | | | | | | | | | | | | | |
| 7 | Brewers | Tigers | ○ | ○ | ○ | ○ | ○ | ○ | ○ | ○ | ○ | ○ | ○ | ○ | ○ | ○ | ○ | ○ |
| 8 | Yankees | Mariners | ○ | ○ | ○ | ○ | ○ | ○ | ○ | ○ | ○ | ○ | ○ | ○ | ○ | ○ | ○ | ○ |
| 9 | Braves | Reds | ○ | ○ | ○ | ○ | ○ | ○ | ○ | ○ | ○ | ○ | ○ | ○ | ○ | ○ | ○ | ○ |

Figure 4

5 BASEBALL

AMERICAN LEAGUE CHAMPIONSHIP

Baltimore Orioles vs. New York Yankees

| GAMES | PREDICTIONS | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | +15 |
| Game 1 | O | O | O | O | O | O | O | O | O | O | O | O | O | O | O | O |
| Game 2 | O | O | O | O | O | O | O | O | O | O | O | O | O | O | O | O |
| Game 3 | O | O | O | O | O | O | O | O | O | O | O | O | O | O | O | O |
| Game 4 | O | O | O | O | O | O | O | O | O | O | O | O | O | O | O | O |
| Game 5 | O | O | O | O | O | O | O | O | O | O | O | O | O | O | O | O |
| Game 6 | O | O | O | O | O | O | O | O | O | O | O | O | O | O | O | O |
| Game 7 | O | O | O | O | O | O | O | O | O | O | O | O | O | O | O | O |

6 BASEBALL

NATIONAL LEAGUE CHAMPIONSHIP

Atlanta Braves vs. St. Loius Cardinals

| GAMES | PREDICTIONS | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | +15 |
| Game 1 | O | O | O | O | O | O | O | O | O | O | O | O | O | O | O | O |
| Game 2 | O | O | O | O | O | O | O | O | O | O | O | O | O | O | O | O |
| Game 3 | O | O | O | O | O | O | O | O | O | O | O | O | O | O | O | O |
| Game 4 | O | O | O | O | O | O | O | O | O | O | O | O | O | O | O | O |
| Game 5 | O | O | O | O | O | O | O | O | O | O | O | O | O | O | O | O |
| Game 6 | O | O | O | O | O | O | O | O | O | O | O | O | O | O | O | O |
| Game 7 | O | O | O | O | O | O | O | O | O | O | O | O | O | O | O | O |

Figure 5

| 7 | | | | | | | | | | | | | | | | BASEBALL |
|---|---|---|---|---|---|---|---|---|---|---|---|---|---|---|---|---|
| WORLD SERIES | | | | | | | | | | | | | | | | |
| Atlanta Braves vs. New York Yankees | | | | | | | | | | | | | | | | |
| GAMES | PREDICTIONS | | | | | | | | | | | | | | | |
| | 1 | 2 | 3 | 4 | 5 | 6 | 7 | 8 | 9 | 10 | 11 | 12 | 13 | 14 | 15 | +15 |
| Game 1 | ○ | ○ | ○ | ○ | ○ | ○ | ○ | ○ | ○ | ○ | ○ | ○ | ○ | ○ | ○ | ○ |
| Game 2 | ○ | ○ | ○ | ○ | ○ | ○ | ○ | ○ | ○ | ○ | ○ | ○ | ○ | ○ | ○ | ○ |
| Game 3 | ○ | ○ | ○ | ○ | ○ | ○ | ○ | ○ | ○ | ○ | ○ | ○ | ○ | ○ | ○ | ○ |
| Game 4 | ○ | ○ | ○ | ○ | ○ | ○ | ○ | ○ | ○ | ○ | ○ | ○ | ○ | ○ | ○ | ○ |
| Game 5 | ○ | ○ | ○ | ○ | ○ | ○ | ○ | ○ | ○ | ○ | ○ | ○ | ○ | ○ | ○ | ○ |
| Game 6 | ○ | ○ | ○ | ○ | ○ | ○ | ○ | ○ | ○ | ○ | ○ | ○ | ○ | ○ | ○ | ○ |
| Game 7 | ○ | ○ | ○ | ○ | ○ | ○ | ○ | ○ | ○ | ○ | ○ | ○ | ○ | ○ | ○ | ○ |

Figure 6

| 1 | | | FOOTBALL | | | | | | |
|---|---|---|---|---|---|---|---|---|---|
| GAMES | | | PREDICTIONS | | | | | | |
| | HOME | VISITOR | 0-10 | 11-21 | 21-28 | 29-39 | 40-49 | 50-55 | over 55 |
| 1 | Arizona | Cincinnati | ○ | ○ | ○ | ○ | ○ | ○ | ○ |
| 2 | Atlanta | Detroit | ○ | ○ | ○ | ○ | ○ | ○ | ○ |
| 3 | Indianapolis | Miami | ○ | ○ | ○ | ○ | ○ | ○ | ○ |
| 4 | Minnesota | Buffalo | ○ | ○ | ○ | ○ | ○ | ○ | ○ |
| 5 | New Orleans | St. Louis | ○ | ○ | ○ | ○ | ○ | ○ | ○ |
| 6 | Oakland | Tennessee | ○ | ○ | ○ | ○ | ○ | ○ | ○ |
| 7 | Philadelphia | N.Y. Giants | ○ | ○ | ○ | ○ | ○ | ○ | ○ |
| 8 | San Diego | New England | ○ | ○ | ○ | ○ | ○ | ○ | ○ |
| 9 | Jacksonville | Baltimore | ○ | ○ | ○ | ○ | ○ | ○ | ○ |

Figure 7A

| 1 | | | FOOTBALL | | | | | | |
|---|---|---|---|---|---|---|---|---|---|
| GAMES | | | PREDICTIONS | | | | | | |
| | HOME | VISITOR | 0-10 | 11-21 | 21-28 | 29-39 | 40-49 | 50-55 | over 55 |
| 1 | Arizona | Cincinnati | ○ | ● | ○ | ○ | ○ | ○ | ○ |
| 2 | Atlanta | Detroit | ○ | ○ | ○ | ○ | ● | ● | ○ |
| 3 | Indianapolis | Miami | ○ | ○ | ○ | ● | ○ | ○ | ○ |
| 4 | Minnesota | Buffalo | ○ | ○ | ○ | ○ | ○ | ○ | ● |
| 5 | New Orleans | St. Louis | ○ | ○ | ○ | ○ | ● | ○ | ○ |
| 6 | Oakland | Tennessee | ○ | ○ | ○ | ○ | ● | ○ | ○ |
| 7 | Philadelphia | N.Y. Giants | ○ | ○ | ● | ○ | ○ | ○ | ○ |
| 8 | San Diego | New England | ○ | ○ | ○ | ○ | ● | ○ | ○ |
| 9 | Jacksonville | Baltimore | ○ | ○ | ○ | ○ | ○ | ● | ○ |

Figure 7B

| 1 | | | FOOTBALL | | | | | | |
|---|---|---|---|---|---|---|---|---|---|
| | GAMES | | PREDICTIONS | | | | | | |
| | HOME | VISITOR | 0-10 | 11-21 | 21-28 | 29-39 | 40-49 | 50-55 | over 55 |
| 1 | Arizona | Cincinnati | ○ | ● | ○ | ○ | ○ | ○ | ○ |
| 2 | Atlanta | Detroit | ○ | ○ | ○ | ● | ● | ● | ○ |
| 3 | Indianapolis | Miami | ○ | ○ | ○ | ● | ○ | ○ | ○ |
| 4 | Minnesota | Buffalo | ○ | ○ | ○ | ○ | ○ | ○ | ● |
| 5 | New Orleans | St. Louis | ○ | ○ | ○ | ○ | ● | ○ | ○ |
| 6 | Oakland | Tennessee | ○ | ○ | ○ | ○ | ● | ○ | ○ |
| 7 | Philadelphia | N.Y. Giants | ○ | ○ | ● | ○ | ○ | ○ | ○ |
| 8 | San Diego | New England | ○ | ○ | ○ | ○ | ● | ○ | ○ |
| 9 | Jacksonville | Baltimore | ○ | ○ | ○ | ○ | ○ | ● | ○ |

Figure 7C

1 FOOTBALL

NFL PLAYOFFS
AFC WILD CARD ROUND

Miami Dolphins vs. Buffalo Bills

| GAME | | PREDICTIONS | | | | | | | | | | | |
|---|---|---|---|---|---|---|---|---|---|---|---|---|---|
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Miami | O | O | O | O | O | O | O | O | O | O | O | O |
| | Buffalo | O | O | O | O | O | O | O | O | O | O | O | O |
| 2nd Quarter | Miami | O | O | O | O | O | O | O | O | O | O | O | O |
| | Buffalo | O | O | O | O | O | O | O | O | O | O | O | O |
| 3rd Quarter | Miami | O | O | O | O | O | O | O | O | O | O | O | O |
| | Buffalo | O | O | O | O | O | O | O | O | O | O | O | O |
| 4th Quarter | Miami | O | O | O | O | O | O | O | O | O | O | O | O |
| | Buffalo | O | O | O | O | O | O | O | O | O | O | O | O |
| Overtime | Miami | O | O | | | | | | | O | O | | |
| | Buffalo | O | O | | | | | | | O | O | | |

2 FOOTBALL

NFL PLAYOFFS
AFC WILD CARD ROUND

Indianapolis Colts vs. San Diego Chargers

| GAME | | PREDICTIONS | | | | | | | | | | | |
|---|---|---|---|---|---|---|---|---|---|---|---|---|---|
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Indianapolis | O | O | O | O | O | O | O | O | O | O | O | O |
| | San Diego | O | O | O | O | O | O | O | O | O | O | O | O |
| 2nd Quarter | Indianapolis | O | O | O | O | O | O | O | O | O | O | O | O |
| | San Diego | O | O | O | O | O | O | O | O | O | O | O | O |
| 3rd Quarter | Indianapolis | O | O | O | O | O | O | O | O | O | O | O | O |
| | San Diego | O | O | O | O | O | O | O | O | O | O | O | O |
| 4th Quarter | Indianapolis | O | O | O | O | O | O | O | O | O | O | O | O |
| | San Diego | O | O | O | O | O | O | O | O | O | O | O | O |
| Overtime | Indianapolis | O | O | | | | | | | O | O | | |
| | San Diego | O | O | | | | | | | O | O | | |

3 FOOTBALL

NFL PLAYOFFS
NFC WILD CARD ROUND

Detroit Lions vs. Philadelphia Eagles

| GAME | | PREDICTIONS | | | | | | | | | | | |
|---|---|---|---|---|---|---|---|---|---|---|---|---|---|
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Detroit | O | O | O | O | O | O | O | O | O | O | O | O |
| | Philadelphia | O | O | O | O | O | O | O | O | O | O | O | O |
| 2nd Quarter | Detroit | O | O | O | O | O | O | O | O | O | O | O | O |
| | Philadelphia | O | O | O | O | O | O | O | O | O | O | O | O |
| 3rd Quarter | Detroit | O | O | O | O | O | O | O | O | O | O | O | O |
| | Philadelphia | O | O | O | O | O | O | O | O | O | O | O | O |
| 4th Quarter | Detroit | O | O | O | O | O | O | O | O | O | O | O | O |
| | Philadelphia | O | O | O | O | O | O | O | O | O | O | O | O |
| Overtime | Detroit | O | O | | | | | | | O | O | | |
| | Philadelphia | O | O | | | | | | | O | O | | |

4 FOOTBALL

NFL PLAYOFFS
NFC WILD CARD ROUND

Atlanta Falcons vs. Green Bay Packers

| GAME | | PREDICTIONS | | | | | | | | | | | |
|---|---|---|---|---|---|---|---|---|---|---|---|---|---|
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Atlanta | O | O | O | O | O | O | O | O | O | O | O | O |
| | Green Bay | O | O | O | O | O | O | O | O | O | O | O | O |
| 2nd Quarter | Atlanta | O | O | O | O | O | O | O | O | O | O | O | O |
| | Green Bay | O | O | O | O | O | O | O | O | O | O | O | O |
| 3rd Quarter | Atlanta | O | O | O | O | O | O | O | O | O | O | O | O |
| | Green Bay | O | O | O | O | O | O | O | O | O | O | O | O |
| 4th Quarter | Atlanta | O | O | O | O | O | O | O | O | O | O | O | O |
| | Green Bay | O | O | O | O | O | O | O | O | O | O | O | O |
| Overtime | Atlanta | O | O | | | | | | | O | O | | |
| | Green Bay | O | O | | | | | | | O | O | | |

Figure 8

| 5 | | FOOTBALL | | | | | | | | | | | |
|---|---|---|---|---|---|---|---|---|---|---|---|---|---|
| NFL PLAYOFFS<br>AFC DIVISIONAL SEMIFINAL | | | | | | | | | | | | | |
| Buffalo Bills vs. Pittsburgh Steelers | | | | | | | | | | | | | |
| GAME | | PREDICTIONS | | | | | | | | | | | |
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Buffalo | O | O | O | O | O | O | O | O | O | O | O | O |
| | Pittsburgh | O | O | O | O | O | O | O | O | O | O | O | O |
| 2nd Quarter | Buffalo | O | O | O | O | O | O | O | O | O | O | O | O |
| | Pittsburgh | O | O | O | O | O | O | O | O | O | O | O | O |
| 3rd Quarter | Buffalo | O | O | O | O | O | O | O | O | O | O | O | O |
| | Pittsburgh | O | O | O | O | O | O | O | O | O | O | O | O |
| 4th Quarter | Buffalo | O | O | O | O | O | O | O | O | O | O | O | O |
| | Pittsburgh | O | O | O | O | O | O | O | O | O | O | O | O |
| Overtime | Buffalo | O | O | | | | | | | O | O | | |
| | Pittsburgh | O | O | | | | | | | O | O | | |

| 6 | | FOOTBALL | | | | | | | | | | | |
|---|---|---|---|---|---|---|---|---|---|---|---|---|---|
| NFL PLAYOFFS<br>NFC WILD CARD ROUND | | | | | | | | | | | | | |
| Green Bay Packers vs. San Francisco 49ers | | | | | | | | | | | | | |
| GAME | | PREDICTIONS | | | | | | | | | | | |
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Green Bay | O | O | O | O | O | O | O | O | O | O | O | O |
| | San Francisco | O | O | O | O | O | O | O | O | O | O | O | O |
| 2nd Quarter | Green Bay | O | O | O | O | O | O | O | O | O | O | O | O |
| | San Francisco | O | O | O | O | O | O | O | O | O | O | O | O |
| 3rd Quarter | Green Bay | O | O | O | O | O | O | O | O | O | O | O | O |
| | San Francisco | O | O | O | O | O | O | O | O | O | O | O | O |
| 4th Quarter | Green Bay | O | O | O | O | O | O | O | O | O | O | O | O |
| | San Francisco | O | O | O | O | O | O | O | O | O | O | O | O |
| Overtime | Green Bay | O | O | | | | | | | O | O | | |
| | San Francisco | O | O | | | | | | | O | O | | |

| 7 | | FOOTBALL | | | | | | | | | | | |
|---|---|---|---|---|---|---|---|---|---|---|---|---|---|
| NFL PLAYOFFS<br>AFC DIVISIONAL SEMIFINAL | | | | | | | | | | | | | |
| Indianapolis Colts vs. Kansas City Cheifs | | | | | | | | | | | | | |
| GAME | | PREDICTIONS | | | | | | | | | | | |
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Indianapolis | O | O | O | O | O | O | O | O | O | O | O | O |
| | Cheifs | O | O | O | O | O | O | O | O | O | O | O | O |
| 2nd Quarter | Indianapolis | O | O | O | O | O | O | O | O | O | O | O | O |
| | Cheifs | O | O | O | O | O | O | O | O | O | O | O | O |
| 3rd Quarter | Indianapolis | O | O | O | O | O | O | O | O | O | O | O | O |
| | Cheifs | O | O | O | O | O | O | O | O | O | O | O | O |
| 4th Quarter | Indianapolis | O | O | O | O | O | O | O | O | O | O | O | O |
| | Cheifs | O | O | O | O | O | O | O | O | O | O | O | O |
| Overtime | Indianapolis | O | O | | | | | | | O | O | | |
| | Cheifs | O | O | | | | | | | O | O | | |

| 8 | | FOOTBALL | | | | | | | | | | | |
|---|---|---|---|---|---|---|---|---|---|---|---|---|---|
| NFL PLAYOFFS<br>NFC WILD CARD ROUND | | | | | | | | | | | | | |
| Philadelphia Eagles vs. Dallas Cowboys | | | | | | | | | | | | | |
| GAME | | PREDICTIONS | | | | | | | | | | | |
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Philadelphia | O | O | O | O | O | O | O | O | O | O | O | O |
| | Dallas | O | O | O | O | O | O | O | O | O | O | O | O |
| 2nd Quarter | Philadelphia | O | O | O | O | O | O | O | O | O | O | O | O |
| | Dallas | O | O | O | O | O | O | O | O | O | O | O | O |
| 3rd Quarter | Philadelphia | O | O | O | O | O | O | O | O | O | O | O | O |
| | Dallas | O | O | O | O | O | O | O | O | O | O | O | O |
| 4th Quarter | Philadelphia | O | O | O | O | O | O | O | O | O | O | O | O |
| | Dallas | O | O | O | O | O | O | O | O | O | O | O | O |
| Overtime | Philadelphia | O | O | | | | | | | O | O | | |
| | Dallas | O | O | | | | | | | O | O | | |

Figure 9

9 FOOTBALL

NFL PLAYOFFS
AFC CHAMPIONSHIP

Indianapolis Colts vs. Pittsburgh Steelers

| GAME | | PREDICTIONS | | | | | | | | | | | |
|---|---|---|---|---|---|---|---|---|---|---|---|---|---|
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Indianapolis | O | O | O | O | O | O | O | O | O | O | O | O |
| | Pittsburgh | O | O | O | O | O | O | O | O | O | O | O | O |
| 2nd Quarter | Indianapolis | O | O | O | O | O | O | O | O | O | O | O | O |
| | Pittsburgh | O | O | O | O | O | O | O | O | O | O | O | O |
| 3rd Quarter | Indianapolis | O | O | O | O | O | O | O | O | O | O | O | O |
| | Pittsburgh | O | O | O | O | O | O | O | O | O | O | O | O |
| 4th Quarter | Indianapolis | O | O | O | O | O | O | O | O | O | O | O | O |
| | Pittsburgh | O | O | O | O | O | O | O | O | O | O | O | O |
| Overtime | Indianapolis | O | O | | | | | | | O | O | | |
| | Pittsburgh | O | O | | | | | | | O | O | | |

10 FOOTBALL

NFL PLAYOFFS
NFC CHAMPIONSHIP

Green Bay Packers vs. Dallas Cowboys

| GAME | | PREDICTIONS | | | | | | | | | | | |
|---|---|---|---|---|---|---|---|---|---|---|---|---|---|
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Green Bay | O | O | O | O | O | O | O | O | O | O | O | O |
| | Dallas | O | O | O | O | O | O | O | O | O | O | O | O |
| 2nd Quarter | Green Bay | O | O | O | O | O | O | O | O | O | O | O | O |
| | Dallas | O | O | O | O | O | O | O | O | O | O | O | O |
| 3rd Quarter | Green Bay | O | O | O | O | O | O | O | O | O | O | O | O |
| | Dallas | O | O | O | O | O | O | O | O | O | O | O | O |
| 4th Quarter | Green Bay | O | O | O | O | O | O | O | O | O | O | O | O |
| | Dallas | O | O | O | O | O | O | O | O | O | O | O | O |
| Overtime | Green Bay | O | O | | | | | | | O | O | | |
| | Dallas | O | O | | | | | | | O | O | | |

Figure 10

| 11 | | FOOTBALL | | | | | | | | | | | |
|---|---|---|---|---|---|---|---|---|---|---|---|---|---|
| SUPER BOWL XXX | | | | | | | | | | | | | |
| Pittsburgh Steelers vs. Dallas Cowboys | | | | | | | | | | | | | |
| GAME | | PREDICTIONS | | | | | | | | | | | |
| | | Touch Down | | | | Conversion | | | | Field Goal | | | |
| | | 0 | 1 | 2 | 3 | 0 | 1 | 2 | 3 | 0 | 1 | 2 | 3 |
| 1st Quarter | Pittsburgh | O | O | O | O | O | O | O | O | O | O | O | O |
| | Dallas | O | O | O | O | O | O | O | O | O | O | O | O |
| 2nd Quarter | Pittsburgh | O | O | O | O | O | O | O | O | O | O | O | O |
| | Dallas | O | O | O | O | O | O | O | O | O | O | O | O |
| 3rd Quarter | Pittsburgh | O | O | O | O | O | O | O | O | O | O | O | O |
| | Dallas | O | O | O | O | O | O | O | O | O | O | O | O |
| 4th Quarter | Pittsburgh | O | O | O | O | O | O | O | O | O | O | O | O |
| | Dallas | O | O | O | O | O | O | O | O | O | O | O | O |
| Overtime | Pittsburgh | O | O | | | | | | | O | O | | |
| | Dallas | O | O | | | | | | | O | O | | |

Figure 11

| 1 | | | HOCKEY | | | | | | | | | | |
|---|---|---|---|---|---|---|---|---|---|---|---|---|---|
| GAMES | | | PREDICTIONS | | | | | | | | | | |
| | HOME | VISITOR | 1 | 2 | 3 | 4 | 5 | 6 | 7 | 8 | 9 | 10 | +10 |
| 1 | NY Rangers | Ottawa | ○ | ○ | ○ | ○ | ○ | ○ | ○ | ○ | ○ | ○ | ○ |
| 2 | Montreal | NY Islanders | ○ | ○ | ○ | ○ | ○ | ○ | ○ | ○ | ○ | ○ | ○ |
| 3 | Calgary | San Jose | ○ | ○ | ○ | ○ | ○ | ○ | ○ | ○ | ○ | ○ | ○ |
| 4 | Florida | Los Angeles | ○ | ○ | ○ | ○ | ○ | ○ | ○ | ○ | ○ | ○ | ○ |
| 5 | Philadelphia | Colorado | ○ | ○ | ○ | ○ | ○ | ○ | ○ | ○ | ○ | ○ | ○ |
| 6 | Vancouver | Toronto | ○ | ○ | ○ | ○ | ○ | ○ | ○ | ○ | ○ | ○ | ○ |
| 7 | Washington | Hartford | ○ | ○ | ○ | ○ | ○ | ○ | ○ | ○ | ○ | ○ | ○ |

Figure 12A

| 1 | | | HOCKEY | | | | | | | | | | |
|---|---|---|---|---|---|---|---|---|---|---|---|---|---|
| GAMES | | | PREDICTIONS | | | | | | | | | | |
| | HOME | VISITOR | 1 | 2 | 3 | 4 | 5 | 6 | 7 | 8 | 9 | 10 | +10 |
| 1 | NY Rangers | Ottawa | ○ | ○ | ○ | ○ | ○ | ● | ○ | ○ | ○ | ○ | ○ |
| 2 | Montreal | NY Islanders | ○ | ○ | ○ | ○ | ○ | ○ | ○ | ○ | ● | ○ | ○ |
| 3 | Calgary | San Jose | ○ | ○ | ● | ● | ○ | ○ | ○ | ○ | ○ | ○ | ○ |
| 4 | Florida | Los Angeles | ○ | ○ | ○ | ○ | ● | ○ | ○ | ○ | ○ | ○ | ○ |
| 5 | Philadelphia | Colorado | ○ | ○ | ○ | ○ | ○ | ○ | ○ | ○ | ○ | ○ | ● |
| 6 | Vancouver | Toronto | ○ | ○ | ○ | ○ | ○ | ○ | ● | ○ | ○ | ○ | ○ |
| 7 | Washington | Hartford | ○ | ○ | ○ | ○ | ○ | ○ | ● | ○ | ○ | ○ | ○ |

Figure 12B

| 1 | | | HOCKEY | | | | | | | | | | |
|---|---|---|---|---|---|---|---|---|---|---|---|---|---|
| GAMES | | | PREDICTIONS | | | | | | | | | | |
| | HOME | VISITOR | 1 | 2 | 3 | 4 | 5 | 6 | 7 | 8 | 9 | 10 | +10 |
| 1 | NY Rangers | Ottawa | ○ | ○ | ○ | ○ | ○ | ● | ○ | ○ | ○ | ○ | ○ |
| 2 | Montreal | NY Islanders | ○ | ○ | ○ | ○ | ○ | ○ | ○ | ○ | ● | ○ | ○ |
| 3 | Calgary | San Jose | ○ | ○ | ● | ● | ● | ○ | ○ | ○ | ○ | ○ | ○ |
| 4 | Florida | Los Angeles | ○ | ○ | ○ | ○ | ● | ○ | ○ | ○ | ○ | ○ | ○ |
| 5 | Philadelphia | Colorado | ○ | ○ | ○ | ○ | ○ | ○ | ○ | ○ | ○ | ○ | ● |
| 6 | Vancouver | Toronto | ○ | ○ | ○ | ○ | ○ | ○ | ● | ○ | ○ | ○ | ○ |
| 7 | Washington | Hartford | ○ | ○ | ○ | ○ | ○ | ○ | ● | ○ | ○ | ○ | ○ |

Figure 12C

STANLEY CUP

PLAYOFFS

CONFERENCE FIRST ROUND

| 1 | *GAMES* | | PREDICTIONS | | | | |
|---|---|---|---|---|---|---|---|
| HOCKEY | | | 0 | 1 | 2 | 3 | 4 |
| | 1 | Winnipeg | O | O | O | O | O |
| | | Detroit | O | O | O | O | O |
| | 2 | St. Louis | O | O | O | O | O |
| | | Toronto | O | O | O | O | O |
| | 3 | Colorado | O | O | O | O | O |
| | | Vancouver | O | O | O | O | O |
| | 4 | Chicago | O | O | O | O | O |
| | | Calgary | O | O | O | O | O |
| | 5 | Philadelphia | O | O | O | O | O |
| | | Tampa Bay | O | O | O | O | O |
| | 6 | Vancouver | O | O | O | O | O |
| | | Florida | O | O | O | O | O |
| | 7 | Pittsburgh | O | O | O | O | O |
| | | Washington | O | O | O | O | O |
| | 8 | NY Rangers | O | O | O | O | O |
| | | Montreal | O | O | O | O | O |

Figure 13

2 HOCKEY

STANLEY CUP

PLAYOFFS

WESTERN CONFERENCE SEMIFINAL

*Detroit Red Wings vs. St. Louis Blues*

| *GAMES* | PREDICTIONS | | | | | | | | | | | |
|---|---|---|---|---|---|---|---|---|---|---|---|---|
| | 1 | 2 | 3 | 4 | 4 | 5 | 6 | 7 | 8 | 9 | 10 | +10 |
| Game 1 | O | O | O | O | O | O | O | O | O | O | O | O |
| Game 2 | O | O | O | O | O | O | O | O | O | O | O | O |
| Game 3 | O | O | O | O | O | O | O | O | O | O | O | O |
| Game 4 | O | O | O | O | O | O | O | O | O | O | O | O |
| Game 5 | O | O | O | O | O | O | O | O | O | O | O | O |
| Game 6 | O | O | O | O | O | O | O | O | O | O | O | O |
| Game 7 | O | O | O | O | O | O | O | O | O | O | O | O |

3 HOCKEY

STANLEY CUP

PLAYOFFS

WESTERN CONFERENCE SEMIFINAL

*Colorado Avalanche vs. Chicago Blackhawks*

| *GAMES* | PREDICTIONS | | | | | | | | | | | |
|---|---|---|---|---|---|---|---|---|---|---|---|---|
| | 1 | 2 | 3 | 4 | 4 | 5 | 6 | 7 | 8 | 9 | 10 | +10 |
| Game 1 | O | O | O | O | O | O | O | O | O | O | O | O |
| Game 2 | O | O | O | O | O | O | O | O | O | O | O | O |
| Game 3 | O | O | O | O | O | O | O | O | O | O | O | O |
| Game 4 | O | O | O | O | O | O | O | O | O | O | O | O |
| Game 5 | O | O | O | O | O | O | O | O | O | O | O | O |
| Game 6 | O | O | O | O | O | O | O | O | O | O | O | O |
| Game 7 | O | O | O | O | O | O | O | O | O | O | O | O |

4 HOCKEY

STANLEY CUP

PLAYOFFS

EASTERN CONFERENCE SEMIFINAL

*Pittsburgh Penguins vs. New York Rangers*

| *GAMES* | PREDICTIONS | | | | | | | | | | | |
|---|---|---|---|---|---|---|---|---|---|---|---|---|
| | 1 | 2 | 3 | 4 | 4 | 5 | 6 | 7 | 8 | 9 | 10 | +10 |
| Game 1 | O | O | O | O | O | O | O | O | O | O | O | O |
| Game 2 | O | O | O | O | O | O | O | O | O | O | O | O |
| Game 3 | O | O | O | O | O | O | O | O | O | O | O | O |
| Game 4 | O | O | O | O | O | O | O | O | O | O | O | O |
| Game 5 | O | O | O | O | O | O | O | O | O | O | O | O |
| Game 6 | O | O | O | O | O | O | O | O | O | O | O | O |
| Game 7 | O | O | O | O | O | O | O | O | O | O | O | O |

5 HOCKEY

STANLEY CUP

PLAYOFFS

EASTERN CONFERENCE SEMIFINAL

*Philadelphia Flyers vs. Florida Panthers*

| *GAMES* | PREDICTIONS | | | | | | | | | | | |
|---|---|---|---|---|---|---|---|---|---|---|---|---|
| | 1 | 2 | 3 | 4 | 4 | 5 | 6 | 7 | 8 | 9 | 10 | +10 |
| Game 1 | O | O | O | O | O | O | O | O | O | O | O | O |
| Game 2 | O | O | O | O | O | O | O | O | O | O | O | O |
| Game 3 | O | O | O | O | O | O | O | O | O | O | O | O |
| Game 4 | O | O | O | O | O | O | O | O | O | O | O | O |
| Game 5 | O | O | O | O | O | O | O | O | O | O | O | O |
| Game 6 | O | O | O | O | O | O | O | O | O | O | O | O |
| Game 7 | O | O | O | O | O | O | O | O | O | O | O | O |

Figure 14

6

HOCKEY

STANLEY CUP

PLAYOFFS

WESTERN CONFERENCE CHAMPIONSHIP

*Detroit Red Wings vs. Colorado Avalanche*

| *GAMES* | PREDICTIONS | | | | | | | | | | | |
|---|---|---|---|---|---|---|---|---|---|---|---|---|
| | 1 | 2 | 3 | 4 | 4 | 5 | 6 | 7 | 8 | 9 | 10 | +10 |
| Game 1 | O | O | O | O | O | O | O | O | O | O | O | O |
| Game 2 | O | O | O | O | O | O | O | O | O | O | O | O |
| Game 3 | O | O | O | O | O | O | O | O | O | O | O | O |
| Game 4 | O | O | O | O | O | O | O | O | O | O | O | O |
| Game 5 | O | O | O | O | O | O | O | O | O | O | O | O |
| Game 6 | O | O | O | O | O | O | O | O | O | O | O | O |
| Game 7 | O | O | O | O | O | O | O | O | O | O | O | O |

7

HOCKEY

STANLEY CUP

PLAYOFFS

EASTERN CONFERENCE CHAMPIONSHIP

*Florida Panthers vs. Pittsburgh Penguins*

| *GAMES* | PREDICTIONS | | | | | | | | | | | |
|---|---|---|---|---|---|---|---|---|---|---|---|---|
| | 1 | 2 | 3 | 4 | 4 | 5 | 6 | 7 | 8 | 9 | 10 | +10 |
| Game 1 | O | O | O | O | O | O | O | O | O | O | O | O |
| Game 2 | O | O | O | O | O | O | O | O | O | O | O | O |
| Game 3 | O | O | O | O | O | O | O | O | O | O | O | O |
| Game 4 | O | O | O | O | O | O | O | O | O | O | O | O |
| Game 5 | O | O | O | O | O | O | O | O | O | O | O | O |
| Game 6 | O | O | O | O | O | O | O | O | O | O | O | O |
| Game 7 | O | O | O | O | O | O | O | O | O | O | O | O |

Figure 15

6

HOCKEY

STANLEY CUP

PLAYOFFS
FINAL

*Florida Panthers vs. Colorado Avalanche*

| *GAMES* | PREDICTIONS | | | | | | | | | | | |
|---|---|---|---|---|---|---|---|---|---|---|---|---|
| | 1 | 2 | 3 | 4 | 4 | 5 | 6 | 7 | 8 | 9 | 10 | +10 |
| Game 1 | O | O | O | O | O | O | O | O | O | O | O | O |
| Game 2 | O | O | O | O | O | O | O | O | O | O | O | O |
| Game 3 | O | O | O | O | O | O | O | O | O | O | O | O |
| Game 4 | O | O | O | O | O | O | O | O | O | O | O | O |
| Game 5 | O | O | O | O | O | O | O | O | O | O | O | O |
| Game 6 | O | O | O | O | O | O | O | O | O | O | O | O |
| Game 7 | O | O | O | O | O | O | O | O | O | O | O | O |

Figure 16

| 1 | | | BASKETBALL | | | | | | | | | |
|---|---|---|---|---|---|---|---|---|---|---|---|---|
| GAMES | | | PREDICTIONS | | | | | | | | | |
| | HOME | VISITOR | - 180 | 180-185 | 186-190 | 191-195 | 196-200 | 201-205 | 206-210 | 211-215 | 216-220 | 220 + |
| 1 | NY Knicks | Hawks | ○ | ○ | ○ | ○ | ○ | ○ | ○ | ○ | ○ | ○ |
| 2 | Indiana | Cleveland | ○ | ○ | ○ | ○ | ○ | ○ | ○ | ○ | ○ | ○ |
| 3 | Toronto | Detroit | ○ | ○ | ○ | ○ | ○ | ○ | ○ | ○ | ○ | ○ |
| 4 | Houston | LA Clippers | ○ | ○ | ○ | ○ | ○ | ○ | ○ | ○ | ○ | ○ |
| 5 | Portland | Dallas | ○ | ○ | ○ | ○ | ○ | ○ | ○ | ○ | ○ | ○ |
| 6 | Utah | Miami | ○ | ○ | ○ | ○ | ○ | ○ | ○ | ○ | ○ | ○ |
| 7 | Charlotte | Washington | ○ | ○ | ○ | ○ | ○ | ○ | ○ | ○ | ○ | ○ |

Figure 17A

| 1 | | | BASKETBALL | | | | | | | | | |
|---|---|---|---|---|---|---|---|---|---|---|---|---|
| GAMES | | | PREDICTIONS | | | | | | | | | |
| | HOME | VISITOR | - 180 | 180-185 | 186-190 | 191-195 | 196-200 | 201-205 | 206-210 | 211-215 | 216-220 | 220 + |
| 1 | NY Knicks | Hawks | ○ | ● | ○ | ○ | ○ | ○ | ○ | ○ | ○ | ○ |
| 2 | Indiana | Cleveland | ○ | ● | ○ | ○ | ○ | ○ | ○ | ○ | ○ | ○ |
| 3 | Toronto | Detroit | ○ | ○ | ○ | ○ | ○ | ● | ○ | ○ | ○ | ○ |
| 4 | Houston | LA Clippers | ○ | ○ | ○ | ○ | ○ | ○ | ● | ○ | ○ | ○ |
| 5 | Portland | Dallas | ○ | ○ | ○ | ○ | ● | ○ | ○ | ○ | ○ | ○ |
| 6 | Utah | Miami | ○ | ○ | ○ | ○ | ○ | ○ | ○ | ○ | ● | ● |
| 7 | Charlotte | Washington | ○ | ○ | ○ | ○ | ● | ○ | ○ | ○ | ○ | ○ |

Figure 17B

| 1 | | | BASKETBALL | | | | | | | | | |
|---|---|---|---|---|---|---|---|---|---|---|---|---|
| GAMES | | | PREDICTIONS | | | | | | | | | |
| | HOME | VISITOR | - 180 | 180-185 | 186-190 | 191-195 | 196-200 | 201-205 | 206-210 | 211-215 | 216-220 | 220 + |
| 1 | NY Knicks | Hawks | ○ | ● | ○ | ○ | ○ | ○ | ○ | ○ | ○ | ○ |
| 2 | Indiana | Cleveland | ○ | ● | ○ | ○ | ○ | ○ | ○ | ○ | ○ | ○ |
| 3 | Toronto | Detroit | ○ | ○ | ○ | ○ | ○ | ● | ○ | ○ | ○ | ○ |
| 4 | Houston | LA Clippers | ○ | ○ | ○ | ○ | ○ | ○ | ● | ○ | ○ | ○ |
| 5 | Portland | Dallas | ○ | ○ | ○ | ○ | ● | ○ | ○ | ○ | ○ | ○ |
| 6 | Utah | Miami | ○ | ○ | ○ | ○ | ○ | ○ | ○ | ● | ● | ● |
| 7 | Charlotte | Washington | ○ | ○ | ○ | ○ | ● | ○ | ○ | ○ | ○ | ○ |

Figure 17C

NBA

PLAYOFFS

CONFERENCE FIRST ROUND

| 1 | GAMES | | PREDICTIONS | | | |
|---|---|---|---|---|---|---|
| BASKETBALL | | | 0 | 1 | 2 | 3 |
| | 1 | Seattle | ○ | ○ | ○ | ○ |
| | | Sacramento | ○ | ○ | ○ | ○ |
| | 2 | Los Angeles | ○ | ○ | ○ | ○ |
| | | Houston | ○ | ○ | ○ | ○ |
| | 3 | San Antonio | ○ | ○ | ○ | ○ |
| | | Phoenix | ○ | ○ | ○ | ○ |
| | 4 | Utah | ○ | ○ | ○ | ○ |
| | | Portland | ○ | ○ | ○ | ○ |
| | 5 | Chicago | ○ | ○ | ○ | ○ |
| | | Miami | ○ | ○ | ○ | ○ |
| | 6 | New York | ○ | ○ | ○ | ○ |
| | | Cleveland | ○ | ○ | ○ | ○ |
| | 7 | Orlando | ○ | ○ | ○ | ○ |
| | | Detroit | ○ | ○ | ○ | ○ |
| | 8 | Indiana | ○ | ○ | ○ | ○ |
| | | Atlanta | ○ | ○ | ○ | ○ |

Figure 18

2 BASKETBALL PLAYOFFS

WESTERN CONFERENCE SEMIFINALP

Seattle Supersonics vs. Houston Rockets

| GAMES | PREDICTIONS | | | | | | | | | |
|---|---|---|---|---|---|---|---|---|---|---|
| | - 180 | 180-185 | 186-190 | 191-195 | 196-200 | 201-205 | 206-210 | 211-215 | 216-220 | 220 + |
| Game 1 | O | O | O | O | O | O | O | O | O | O |
| Game 2 | O | O | O | O | O | O | O | O | O | O |
| Game 3 | O | O | O | O | O | O | O | O | O | O |
| Game 4 | O | O | O | O | O | O | O | O | O | O |
| Game 5 | O | O | O | O | O | O | O | O | O | O |
| Game 6 | O | O | O | O | O | O | O | O | O | O |
| Game 7 | O | O | O | O | O | O | O | O | O | O |

3 BASKETBALL PLAYOFFS

WESTERN CONFERENCE SEMIFINALP

San Antonio Spurs vs. Utah Jazz

| GAMES | PREDICTIONS | | | | | | | | | |
|---|---|---|---|---|---|---|---|---|---|---|
| | - 180 | 180-185 | 186-190 | 191-195 | 196-200 | 201-205 | 206-210 | 211-215 | 216-220 | 220 + |
| Game 1 | O | O | O | O | O | O | O | O | O | O |
| Game 2 | O | O | O | O | O | O | O | O | O | O |
| Game 3 | O | O | O | O | O | O | O | O | O | O |
| Game 4 | O | O | O | O | O | O | O | O | O | O |
| Game 5 | O | O | O | O | O | O | O | O | O | O |
| Game 6 | O | O | O | O | O | O | O | O | O | O |
| Game 7 | O | O | O | O | O | O | O | O | O | O |

4 BASKETBALL PLAYOFFS

EASTERN CONFERENCE SEMIFINALP

Chicago Bulls vs. New York Knicks

| GAMES | PREDICTIONS | | | | | | | | | |
|---|---|---|---|---|---|---|---|---|---|---|
| | - 180 | 180-185 | 186-190 | 191-195 | 196-200 | 201-205 | 206-210 | 211-215 | 216-220 | 220 + |
| Game 1 | O | O | O | O | O | O | O | O | O | O |
| Game 2 | O | O | O | O | O | O | O | O | O | O |
| Game 3 | O | O | O | O | O | O | O | O | O | O |
| Game 4 | O | O | O | O | O | O | O | O | O | O |
| Game 5 | O | O | O | O | O | O | O | O | O | O |
| Game 6 | O | O | O | O | O | O | O | O | O | O |
| Game 7 | O | O | O | O | O | O | O | O | O | O |

5 BASKETBALL PLAYOFFS

EASTERN CONFERENCE SEMIFINALP

Orlando Magic vs. Atlanta Hawks

| GAMES | PREDICTIONS | | | | | | | | | |
|---|---|---|---|---|---|---|---|---|---|---|
| | - 180 | 180-185 | 186-190 | 191-195 | 196-200 | 201-205 | 206-210 | 211-215 | 216-220 | 220 + |
| Game 1 | O | O | O | O | O | O | O | O | O | O |
| Game 2 | O | O | O | O | O | O | O | O | O | O |
| Game 3 | O | O | O | O | O | O | O | O | O | O |
| Game 4 | O | O | O | O | O | O | O | O | O | O |
| Game 5 | O | O | O | O | O | O | O | O | O | O |
| Game 6 | O | O | O | O | O | O | O | O | O | O |
| Game 7 | O | O | O | O | O | O | O | O | O | O |

Figure 19

| 6 | BASKETBALL PLAYOFFS | | | | | | | | | |
|---|---|---|---|---|---|---|---|---|---|---|
| WESTERN CONFERENCE CHAMPIONSHIP | | | | | | | | | | |
| Seattle Supersonic,s vs. Utah Jazz | | | | | | | | | | |
| GAMES | PREDICTIONS | | | | | | | | | |
| | - 180 | 180-185 | 186-190 | 191-195 | 196-200 | 201-205 | 206-210 | 211-215 | 216-220 | 220 + |
| Game 1 | ○ | ○ | ○ | ○ | ○ | ○ | ○ | ○ | ○ | ○ |
| Game 2 | ○ | ○ | ○ | ○ | ○ | ○ | ○ | ○ | ○ | ○ |
| Game 3 | ○ | ○ | ○ | ○ | ○ | ○ | ○ | ○ | ○ | ○ |
| Game 4 | ○ | ○ | ○ | ○ | ○ | ○ | ○ | ○ | ○ | ○ |
| Game 5 | ○ | ○ | ○ | ○ | ○ | ○ | ○ | ○ | ○ | ○ |
| Game 6 | ○ | ○ | ○ | ○ | ○ | ○ | ○ | ○ | ○ | ○ |
| Game 7 | ○ | ○ | ○ | ○ | ○ | ○ | ○ | ○ | ○ | ○ |

| 7 | BASKETBALL PLAYOFFS | | | | | | | | | |
|---|---|---|---|---|---|---|---|---|---|---|
| EASTERN CONFERENCE CHAMPIONSHIP | | | | | | | | | | |
| Chicago Bulls vs. Orlando Magic | | | | | | | | | | |
| GAMES | PREDICTIONS | | | | | | | | | |
| | - 180 | 180-185 | 186-190 | 191-195 | 196-200 | 201-205 | 206-210 | 211-215 | 216-220 | 220 + |
| Game 1 | ○ | ○ | ○ | ○ | ○ | ○ | ○ | ○ | ○ | ○ |
| Game 2 | ○ | ○ | ○ | ○ | ○ | ○ | ○ | ○ | ○ | ○ |
| Game 3 | ○ | ○ | ○ | ○ | ○ | ○ | ○ | ○ | ○ | ○ |
| Game 4 | ○ | ○ | ○ | ○ | ○ | ○ | ○ | ○ | ○ | ○ |
| Game 5 | ○ | ○ | ○ | ○ | ○ | ○ | ○ | ○ | ○ | ○ |
| Game 6 | ○ | ○ | ○ | ○ | ○ | ○ | ○ | ○ | ○ | ○ |
| Game 7 | ○ | ○ | ○ | ○ | ○ | ○ | ○ | ○ | ○ | ○ |

Figure 20

| 8 | BASKETBALL PLAYOFFS | | | | | | | | | |
|---|---|---|---|---|---|---|---|---|---|---|
| FINAL | | | | | | | | | | |
| Chicago Bulls vs. Seattle Supersonics | | | | | | | | | | |
| GAMES | PREDICTIONS | | | | | | | | | |
| | - 180 | 180-185 | 186-190 | 191-195 | 196-200 | 201-205 | 206-210 | 211-215 | 216-220 | 220 + |
| Game 1 | ❍ | ❍ | ❍ | ❍ | ❍ | ❍ | ❍ | ❍ | ❍ | ❍ |
| Game 2 | ❍ | ❍ | ❍ | ❍ | ❍ | ❍ | ❍ | ❍ | ❍ | ❍ |
| Game 3 | ❍ | ❍ | ❍ | ❍ | ❍ | ❍ | ❍ | ❍ | ❍ | ❍ |
| Game 4 | ❍ | ❍ | ❍ | ❍ | ❍ | ❍ | ❍ | ❍ | ❍ | ❍ |
| Game 5 | ❍ | ❍ | ❍ | ❍ | ❍ | ❍ | ❍ | ❍ | ❍ | ❍ |
| Game 6 | ❍ | ❍ | ❍ | ❍ | ❍ | ❍ | ❍ | ❍ | ❍ | ❍ |
| Game 7 | ❍ | ❍ | ❍ | ❍ | ❍ | ❍ | ❍ | ❍ | ❍ | ❍ |

Figure 21

METHOD AND APPARATUS FOR CONDUCTING GAMES OF CHANCE

This application is the parent of continuation-in-part application U.S. Ser. No. 09/020,128 filed Feb. 6, 1998, now U.S. Pat. No. 6,015,345.

FIELD OF THE INVENTION

The invention relates to games of chance in which a large number of participants each pay a fee and select a series of numbers in a prescribed range, with the winner, or winners, being those participants whose numbers correspond to a series of randomly derived numbers, and specifically to games of chance in which the winning numbers are derived from sporting events whose outcomes cannot be predetermined.

BACKGROUND OF THE INVENTION

The conduct of lotteries and sweepstakes by state governments or government-established agencies and corporations has become commonplace in the United States. The lottery is conducted by offering participants the opportunity to win or to share in winning a substantial monetary prize, the prize generally exceeding one million dollars. The winner or winners are determined from participants who have entered the play by identifying up to six different numbers from a predetermined field, say from 1–54, which series matches the numbers placed on six markers randomly drawn from a collection of markers bearing the series of numbers i.e., 1–54.

It has also been proposed to conduct lotteries in conjuncture with sporting events. For example, U.S. Pat. No. 5,518,239 discloses a method in which a series of random numbers are generated by the lottery sponsor and assigned to a given participant. A set of numbers are assigned to possible outcomes of a sporting event, or series of events, such as horse races, and then the outcome numbers are recorded after the sporting event has been completed. The winner is determined by the participant whose randomly assigned numbers match, or come closest to matching the actual outcome numbers. However, the assigning of random numbers deprives the lottery player of a sense of participation in the process. This is a major drawback, and may discourage fans of a particular sport from participating in the lottery.

In U.S. Pat. No. 5,043,889, it is proposed to conduct a sweepstakes game in which the winner correctly predicts a portion of the outcome of a golf tournament. A code number is assigned to each tournament player and the sweepstakes participant enters a number corresponding to the score of each of a preselected number of players. The use of code numbers and associated predicted scores enables the game to be played from a plurality of remote data entry devices, e.g., touch-tone telephones. The data is entered in a central computer for processing and eventual determination of winners who has been assigned a unique access number. Although this method has the advantage of actively involving the participants in the selection of winners, it does lend itself to the possibility of collusion among the golfers playing in a given tournament, or to improper activities by sweepstakes participants, such as attempting to distract or disturb one or more golfers in order to miss a shot and raise that golfer's final score. A lottery based on golf is also likely to attach fewer regular participants, due to its limited appeal and the relatively small number of professional golfers that are well-known to the general public.

It is therefore an object of this invention to provide games of chance conducted in conjunction with popular sporting events in which each game participant selects his or her own series of numbers.

It is another object of the invention to provide a method for conducting games of chance in which the winning combination or series of numbers is determined by the final scores of a plurality of sporting events.

It is a further object of the invention to provide a method of conducting games of chance on at least a weekly basis, or even more frequently, in conjunction with popular national or regional sporting events that take place over a period of time that spans at least several months.

It is yet a further object of this invention to provide a method of conducting games of chance in which the winning combination of numbers is determined by reference to the outcomes of a plurality of competitive sporting events in which the numerical outcome of any single sporting event, or series of sporting events, cannot be readily manipulated by collusion among the players or influenced by interested third-parties.

It is another object of this invention to provide games of chance in which participants can be provided with the option of predicting more than one outcome for one or more of the individual sporting events and where the cost of playing is increased proportionally.

Another object of the invention is to provide a method of conducting games of chance in conjunction with a series of sporting events so that if one or more of the events cannot be completed, e.g., due to inclement weather, or because the final score is subject to a technical or legal challenge, the scores of one or more alternative like sporting events can be substituted.

As it will be shown, the above objectives and other advantages are achieved by the method and apparatus described herein.

SUMMARY OF THE INVENTION

The method and apparatus of the invention relate to games of chance in which a plurality of like sporting events, such as baseball or football games, are identified for play by participants during a given period of time, i.e., on a weekly basis. The winning series of numbers is determined after the identified games have been played to completion, including any overtime, extra innings, and the like. The final value of each team's scoring in the identified set is combined to provide a total numerical value.

Participants receive a game card identifying a principal set of sporting events, such as six baseball games to be played on a given day, or over a weekend, and the participant enters a number that is the predicted value of the sum or total of the scores of the two teams for each event. For example, in the case of a baseball game between New York and Baltimore where the final score is 5 to 4, the value of the total of the teams' scores is 9. The participant is therefore able to exercise his own judgment and knowledge of the sporting event, the respective strengths and weaknesses of the teams playing in each of the events, and can enter his own prediction as to the total number of runs that will be scored in each of the identified games.

In a preferred embodiment of the invention, at least one, and preferably several additional team contests will be identified for the entry of predicted total scores by lottery participants. Should one of the principal events not be completed, for example a baseball game called as a result of inclement weather, or should the final score be the subject of some form of protest and therefore not finally determinable within the time set for the announcement of the winning series of numbers, the total score in the first or successive alternate games can be substituted for that of a principal sporting event.

Game cards can be printed and distributed for weekly play by authorized agents who receive the entry fee and enter the participants' predicted scores, as by keypad or by scanning a game card that has been appropriately marked by the participant. Game cards can also be published in newspapers and weekly periodicals. In a preferred embodiment, game cards are also published electronically, such as over the Internet and/or on the screens of free-standing self-service electronic terminals, so that participants can directly enter their own predicted scores for each series of games.

The technology and equipment for lottery-related transactions already exist in the form of automatic teller machines ("ATMs") and so-called "cash machines", and such machines can readily be appropriately programmed for use by lottery participants. In addition, self-service remote data-entry terminals can be provided with currency accepting and recognition means, similar to bill changers and vending machine devices, as well as with means for accessing a credit or debit account to be identified and activated by the participant. In the event that financial institutions, such as banks, can license the use of their ATMs, a designated fee can be collected from either the agency operating the lottery or the participant through the credit or debit account system.

As used herein with reference to the invention, "remote terminal" means any form of interactive display including desk and laptop personal computers, ATM and cash machines, dedicated devices operated by authorized agents and public terminals installed solely for use by participants. Such remote terminals have a screen for displaying instructions, the game card and means for accepting payment or payment instructions, and a keyboard, keypad and/or touch-responsive screen. The communications between the central computer and the remote terminals can be via dedicated telephone lines, the Internet or wireless digital means.

In accordance with rules established by the sponsoring agency, acceptance of game cards and payment will be discontinued at a prescribed time, preferably on the day that the first game, or games are to be played.

As soon as the final scores from all of the principal and, if necessary, alternate sporting events are available, they are entered into the computer for totalling of individual event scores and then for processing to identify any predicted scores by participants that meet the prize-winning requirements.

The prize-winning requirements are established and announced by the agency responsible for operating the games of chance, which will also be relevant to the odds or probability of winning, as well as the dollar amount of the prizes. For example, the principal sporting events could be six baseball games, and the first prize awarded only to participants who correctly predict the score in each of the six contests; second prize for correctly predicting the total scores of five games; and third prize for four games. Should the agency wish to increase the number of prize winners, i.e., by improving the odds, the number of accurate predictions required for first, second and third prize awards could be reduced to five, four and three games, respectively. If the number of correct predictions required to win a prize is lowered, it may be necessary to set the value of individual prizes, or to limit the total value of each of the prizes so that a number of individual participants meeting the prize-winning requirement will share in the amount designated. The mathematical probabilities and requirements for the award of prizes can readily be determined by statistical analysis of historical records relating to the sporting events, e.g., seasonal statistics for baseball, hockey, basketball and football games.

The final step of verification and the award of prizes to claimants can be based upon any of the well-established principals and practices known to the prior art. Each prize claimant must produce a receipt bearing the unique data entry identification code that corresponds to the code retained in the computer's memory and associated with the prize-winning score predictions.

BRIEF DESCRIPTION OF THE DRAWINGS

These and other features of the invention will be understood and explained with reference to the drawings forming a part of this disclosure in which:

FIG. 2A illustrates a preferred embodiment of one format for a game card for use in a game of chance operated in conjunction with baseball games;

FIG. 2B is the game card of FIG. 2A marked in accordance with a second preferred embodiment of the method of the invention;

FIG. 2C is the game card of FIG. 2A marked in accordance with a third preferred embodiment of the method of the invention;

FIG. 3 is a preferred embodiment of a blank game card for use with baseball league divisional semifinal play-off games;

FIG. 4 is a preferred embodiment of a blank game card for use with baseball league divisional championship games;

FIG. 5 is a preferred embodiment of a blank game card for use with baseball league championship games;

FIG. 6 is a preferred embodiment of a blank game card for use with baseball World Series games;

FIG. 7A illustrates a blank game card for use in the practice of a game of chance in conjunction with football games;

FIG. 7B is the game card of FIG. 7A marked in accordance with a second preferred embodiment of the method of the invention; and FIG. 7C is the game card of FIG. 7A marked in accordance with a third preferred embodiment of the method of the invention.

FIG. 8 is preferred embodiment of a blank game card for use with football first round play-off games;

FIG. 9 is a preferred embodiment of a blank game card for use with divisional semifinal football games;

FIG. 10 is a preferred embodiment of a blank game card for use with conference championship football games;

FIG. 11 is a preferred embodiment of a blank game card for use with the football Super Bowl games;

FIG. 12A is a preferred embodiment of a blank game card for use in connection with regular season hockey games;

FIG. 12B is the game card of FIG. 12A marked in accordance with a second preferred embodiment of the invention;

FIG. 12C is the game card of FIG. 12A marked in accordance with a third preferred embodiment of the invention;

FIG. 13 is a preferred embodiment of a blank game card for use with hockey first round play-off games;

FIG. 14 is a preferred embodiment of a blank game card for use with hockey conference semifinal games;

FIG. 15 is a preferred embodiment of a blank game card for use with hockey conference championship games;

FIG. 16 is a preferred embodiment of a blank game card for use with hockey Stanley Cup championship games;

FIG. 17A is a preferred embodiment of a blank card for use with basketball regular season games;

FIG. 17B is the game card of FIG. 17A marked to illustrate a second preferred embodiment of the invention;

FIG. 17C is the game card of FIG. 17A marked to illustrate a third preferred embodiment of the invention;

FIG. 18 is a preferred embodiment of a blank game card for use with basketball conference first round play-off games;

FIG. 19 is a preferred embodiment of a blank game card for use with basketball conference semifinal games;

FIG. 20 is a preferred embodiment of a blank game card for use with basketball conference championship games; and FIG. 21 is a preferred embodiment of a blank game card for use with the NBA championship games.

DETAILED DESCRIPTION OF THE PREFERRED EMBODIMENTS

Figure 1:
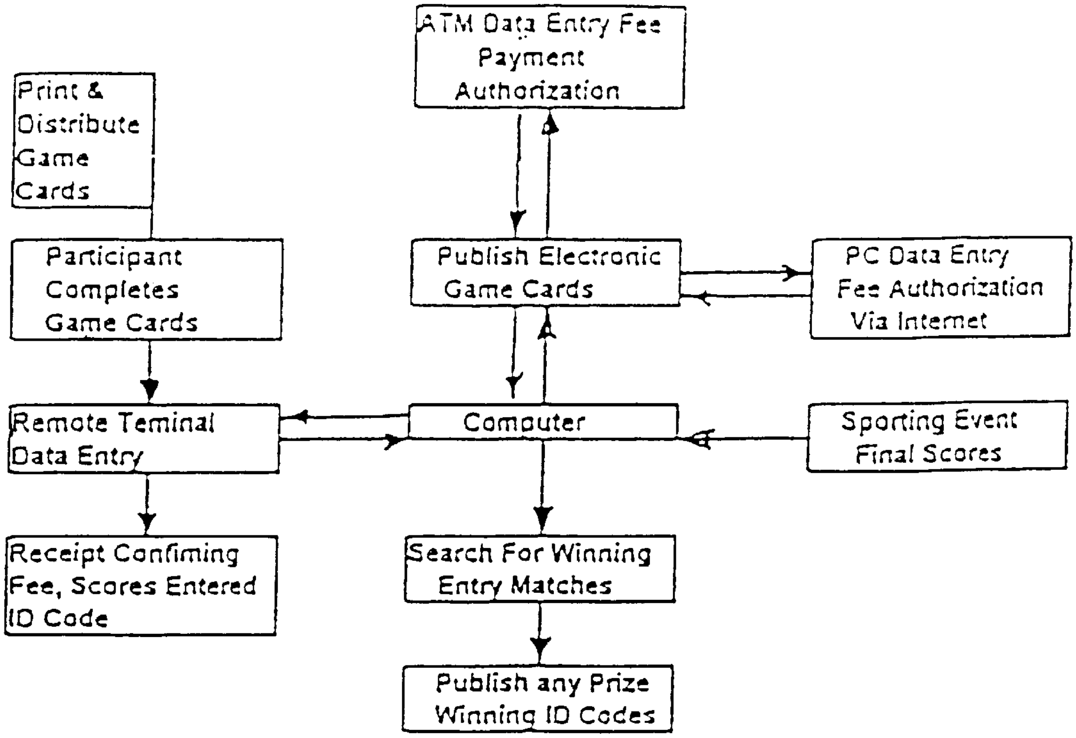
FIG. 1 is a flow chart schematically depicting the steps according to the method and apparatus of the present invention.

As shown in the flow chart of FIG. 1, the lottery sponsor first publishes and distributes game cards to participants. Although there is some overlap in the scheduling of professional sporting events, baseball, football and basketball, for example, are played during well-defined seasons. The schedules of the respective games to be played including the team contests, locations and dates are set well in advance of the dates of the opening games. Using these advance schedules, the sponsoring authority selects a number of principal sporting events that are to be conducted on a given day, or over a few days, generally within a weekly schedule. In order to take account of the possibility of games that are cancelled or not otherwise completed, e.g., baseball games due to inclement weather, one or more alternate games are also identified.

During the baseball season, a sufficient number of contests are played on Saturday and/or Sunday to comprise the events for the principal and alternate games; the majority of professional football games are played on Sunday during the regular season; and the requisite number of basketball and hockey games will be played on a Saturday and/or Sunday schedule.

The particular team contests to be identified on the game card can be based upon such criteria as regional interest, league leadership, public following, and the like. Obviously, the principal purpose to be served in the selection of the games is to maximize participation in the lottery play.

The number of sporting events, or games, to be identified on the game card is determined in conjunction with the requirements for winning prizes and the statistic probability of various number combinations occurring for the various types of sporting events. For example, during baseball season, six principal contests and three alternate contests can be printed on a card. A statistical analysis can be undertaken of the historical data for the respective teams and contests in order to establish a set of probabilities for being able to predict the scores, or score totals for a specified number of events. These determinations will fall within the capabilities of a statistician of ordinary skill in the art.

In a preferred embodiment of the invention, a game card must be completed with at least one appropriate entry for each game to be accepted for play and entry in the central computer with a unique data entry transaction code.

In order to enhance the interest, a series of prizes are awarded, e.g., first prize for correctly predicting the correct scores in a prescribed number of games; second prize for one less than the prescribed correct number of predictions; and third prize for two less than the correct number of predictions. The value of the prizes can be a fixed minimum sum for each participant who meets the prize-winning requirement, or a value which increases with the level of participation in a given week's game; or a monetary prize that must be shared pro rata among the number of participants meeting the prize-winning requirements. Any prizes not awarded can be added to a subsequent contest to increase its value.

Additional awards, such as game tickets, expense-paid trips to play-offs and championship games, and other sports-oriented activities can be given as prizes.

Game Cards

Game cards can be of a printed form that are distributed via authorized agents, or published in newspapers or other periodicals to reach participants. As used herein the term "game cards" is also intended to encompass the electronic publication of the identification of the sporting events in a format that is adapted to permit the participant to electronically enter the predicted scores.

The electronic publication of game cards can take place via the Internet to individual participant's home computer or PCs, to special purpose remote terminals programmed for direct interactive communications with a participant, or to pre-existing remote terminals, e.g., ATM machines and cash machines of the type operated by banks and other financial institutions. In the case of game cards completed via the Internet or through existing ATMs and cash machines, the required entry fee for playing the lottery can be paid by means of the participant's existing credit or debit account.

The advantage of employing pre-existing ATMs and/or cash machines is the minimizing of the initial capital costs for establishing the capability for electronic play. Banks and similar institutions would receive a transaction fee for permitting the use of their machines. The fee could be paid from the entry fee or charged as an additional fee to the participant's account. Programming expenses would be met by the authorized agency, and an attractive cash flow could be generated by even a minimal fee on a large number of transactions occurring on a weekly basis.

The computer program establishes a connection between the agency's dedicated central computer processing system for receipt of data input at the remote terminals, the verification of the entry fee payment, the assignment of a unique data entry transaction code and output or return instructions to the remote terminal to print a receipt to be issued by the machine to the participant at the end of the transaction.

In the case of distribution of the electronic game card via the Internet, the agency establishes a web site with appropriate information and instructions for transmission of a game card to the participant's PC screen. Using the keyboard, the electronic game card image is completed by the participant with the predicted scores and any personal identification, account information, credit and/or debit card payment authorization and other required information.

The data is then transmitted back to the central computer for processing, including entry fee payment verification, entry of the predicted scores, assignment of a unique data entry identification code, and transmission via e-mail of a receipt form to the participant's PC.

As in the case of prior art lottery systems, the remote terminal can be operated by an authorized agent, i.e., a news-stand clerk, who enters the participant's predicted score data into a dedicated terminal that is connected to the central computer via telephone lines. Data entry can be by keyboard, electronic scanning of the appropriate marked card, or other means. The authorized agent collects the entry fee in cash and provides the participant with a printed receipt confirming the predicted scores, fee payment and unique transaction code based on data generated by the central computer.

Fee Calculation

In a first preferred embodiment, a basic entry fee, for example, one dollar, is collected for a card having one score total prediction for each of the contests. In other preferred embodiments, the sponsor can permit a participant to make multiple predictions for one or more of the contests on a single game card.

Acceptance of multiple predictions on a single card would eliminate the necessity for a participant to complete and submit multiple cards, each with a single prediction for each contest, and reduces the data entry time and fee collection procedure.

The fee payable for multiple predictions of the total score for one or more contests on a given card is determined by the following algorithm:

$$(\text{Basic Fee})\times(1^{a}\times 2^{b}\times 3^{c}\times 4^{d}\times 5^{e}\ \ldots\ X^{y})=\text{Total Entry Fee} \quad \text{(I)}$$

where the total number of integers 1, 2, 3 . . . X forming the multipliers are equal to the number of columns for total score predictions, and the powers a,b, c . . . y correspond to the number of times the single or multiple predictions appear on the game card.

For example, in the case where the Basic Fee is one dollar and the participant enters a single prediction for each of the total scores on a six-contest game card, the value of the power a is 6 and the remaining powers are zero, resulting in the Total Entry Fee due of one dollar. If a six-game card is completed as illustrated in FIG. 4, the fee calculation is as follows:

$$1^{1}\times 2^{2}\times 3^{1}\times 4^{0}\times 5^{1}\times 6^{0}\times 7^{0}\times 8^{1}\times 9^{0}\ \ldots\ X^{0},$$

which can be simplified, since the maximum prediction was 8, to:

$$1\times 4\times 3\times 5\times 8=\$480$$

Fee Payment Verification

In a preferred embodiment of the invention, the central computer is programmed to calculate the fee from data entered via keypad or optical character reader at a remote terminal to display the amount of the fee at the remote terminal for the purpose of informing the participant of the fee due. In order to proceed with the transaction, the program requires the entry of a confirmation that the participant has paid the fee, if the transaction is in cash. If a participant's debit or credit account is to be billed for the fee, the central computer is programmed to compare the fee due with the participant's account balance and/or credit limit to confirm that the fee can be paid or charged without exceeding such limit. If sufficient funds are not available, a message to that effect is transmitted for display at the remote terminal and the transaction is terminated. If funds are available, entry of a confirmation is required at the remote terminal indicating the participant's approval and agreement to have the fee charged to his credit or debit account.

Preferred Embodiment for Baseball

A suitable format for a game card, either conventionally printed or electronically generated, for use in conjunction with baseball games is shown in the blank card of FIG. 2A. Six principal games are identified along with three alternate or reserve games. In the event that one or more of the principal games is not played or completed for reasons such as inclement weather, an official protest by one of the teams, or the like, the results of the first and successive alternate games will be substituted for the one or more incomplete principal games.

In the format of FIG. 2A, sixteen columns are positioned to the right of each of the nine contests. The grid formed by the horizontal and vertical lines separating the games and defining the columns defines an array of boxes. It is preferred to use a large blackened mark or dot for ease of reading by optical character readers, or the like. In the example shown in FIG. 2B, the participant enters at least one mark in the box adjacent to each game which corresponds to the predicted total score, i.e., the total of the number of runs scored by both teams during each game. Thus, if the participant predicts that the Orioles will beat the Yankees 5-4, the total runs scored will equal 9 and a mark will be put in the column under the number 9 adjacent the "Yankees vs. Orioles" entry. In the format of FIG. 2A, the column to the extreme right is headed "+15." A mark is placed in this column if the participant predicts that the total of the runs scored by each of the teams in a given contest will be sixteen or greater. Alternatively, this column can be headed "16+". The total number of combinations possible for a game card formatted as in FIG. 2A is 16,777,216

In a second preferred embodiment as illustrated in the game card of FIG. 2B, the participant is given the option of entering one or two predictions of the total score for each of the games. This method of practice in the invention is referred to as the "double play."

In a third preferred embodiment of the invention, as illustrated in FIG. 2C, the participant is given the option of predicting up to three total scores for each of the games. This method is referred to as the "triple play."

The entry fees for the double play and triple play formats are proportionally higher than the single score prediction play since the additional predictions are equivalent to playing a corresponding number of additional single prediction cards. The Total Fee for multiple score predictions is calculated according to formula (I), as described above. For example, if the entry fee for a single prediction for six sporting events is a Basic Fee of one dollar, the entry fee for FIG. 2B for the double play is Total Fee of $8, equivalent to eight separate cards; for the triple play illustrated in FIG. 2C, the Total Fee is $108.

If the entry of multiple predictions of total scores for each event by the participant are to be permitted, the remote terminal is provided with programmed instructions that are displayed to the participant for appropriate data entry sequences. In a preferred embodiment to Total Fee is displayed with each multiple prediction to alert the participant to the increase of the Total Fee.

Baseball—Play-Offs & World Series

The following describes a presently preferred embodiment of the method and apparatus for conducting the game of chance during baseball's divisional and league play-offs and during the World Series. The champions of each of the American and National leagues is determined by divisional play-off games for each league, i.e., the Eastern and Western divisions. As illustrated in FIG. 3, each divisional champion must win three of five games. For convenience, all four of the divisional play-offs are printed or formatted for display on a single card or electronic screen. Each set of play-offs can require three, four or five games to determine the divisional champion. In a preferred embodiment of the method, the player must accurately predict not only the scoring totals for each game played, but also accurately predict the total number of games. For example, with reference to the card numbered 1 in FIG. 3, if the Orioles won three out of four games and the total scores for each game were in accordance with the predictions of FIG. 4, but the participant predicted that a fifth game would be played with a total score of 9, it would not be a winning card. Similarly, if a participant predicted that a division champion would be selected based upon only four games, and correctly predicted the score totals in those four games, but the actual play required five games, that card would not be considered for winning status. A participant can play from one to four of the play-offs shown in the example of FIG. 3.

A game card for the American and National League Championship play-offs is illustrated in FIG. 5, where the respective league champions are determined on the basis of winning four out of a maximum of seven games. In the preferred embodiment of the method, winning participants must correctly predict both the total number of games played, i.e., from four to seven, and score total for each game played. Thus, if the participant enters predictions for seven games and the league championship requires only six games of play for which the participant's predictions are accurate, the card will not be considered in the winning category.

The final phase of the baseball championship is the World Series, determined by the team from the American and National league that wins the best four out of seven games. A suitable game card is shown in FIG. 6. In this preferred embodiment, the same requirements for correctly predicting the number of games played, as well as the score totals is applied. It is also to be understood that in each level of the play-offs, the players can enter a single prediction for each game or multiple predictions for one or more games, and that the cost to the participant will be calculated in accordance with the description provided above.

A participant wishing to place multiple entries as to the number of games to be played in post-season championship must enter by completing separate game cards.

Preferred Embodiment for Football

Shown in FIGS. 7A, 7B and 7C are game cards for use in conjunction with football games. Because of the higher point values allocated to the scoring of touchdowns and the like, the total of the number of points scored during football contests covers a wider numerical range. For this reason, in the preferred embodiment, the columns cover a range of points, e.g., 10 points. In the example of FIG. 7A, the blank game card is provided with 7 columns, the range recited in each column heading being based on probable scoring opportunities. Thus, column 2 covers the point range from 11–21 while column 5 includes the range of 40–49. Column 7 includes all predictions exceeding a total score of 55 points. The football game card identifies nine contests and prizes can be awarded (in descending order) to participants having 9, 8 and 7 correct predictions.

As in the case of the baseball game card, FIGS. 7B and 7C represent embodiments where 2 and 3 score predictions, respectively, are entered on the card. The Total Fee per game for multiple-score predictions is increased as in the baseball example on the basis of the total number of predictions afforded by such multiple entries. The Total Fee is calculated using the algorithm of formula (I).

Football—Play-Offs & Super Bowl

The football play-offs commence with the so-called American Football Conference ("AFC") and National Football Conference ("NFC") wild card games as illustrated in FIG. 8, four games are played, two in each of the AFC and NFC, the winners of each game moving on to the next level in the play-off rounds. Participants can choose to enter predictions in from one to all four of the games in the wild card round. With respect to overtime play, it will be noted that a tie in regular play is broken by the first team to score a touchdown or field goal, so that other alternatives in the bottom line array for each game is limited to the choice of a field goal or touchdown during overtime play.

As shown in the preferred embodiment of the game card of FIG. 9, the divisional semifinals also comprise two games from each of the AFC and NFC. The method of completing the game card is the same as that described above. The winners of the semifinals enter the conference championship finals, and an illustrative game card is shown in FIG. 10 where two teams from each of the AFC and NFC are paired to determine the participants in the Super Bowl. A game card formatted for the football Super Bowl is illustrated by FIG. 11.

In using the game cards of this embodiment, the winner will correctly predict, in each of the four quarters and in the case of overtime, the number of touchdowns scored, the number of additional points/conversions and the number of field goals scored. In addition, a two-point conversion and a safety, i.e., the opposing team downing the ball in the end zone, will each be treated as touchdowns. In a preferred embodiment, an erroneous prediction as to the presence or absence of overtime scoring will result in a non-winning card. The agency conducting the lottery may also decide that during play-offs, no combinations will be permitted.

Preferred Embodiment for Hockey

Shown in FIGS. 12A, 12B and 12C are game cards for use in conjunction with hockey games. In the blank card of FIG. 12A, twelve columns are positioned to the right of each of seven contests. The participant enters a mark in the box adjacent to each game which corresponds to the predicted total score. In the format of FIG. 12A, the column to the extreme right is headed "+10". A mark is placed in this column if the participant predicts that the total of the scores of both teams in a given contest will be greater than 10. In the hockey game of chance, prizes (in descending order) could be awarded to those participants choosing 7, 6 and 5 correct predictions.

As in the case of the baseball game card, FIGS. 12B and 12C represent embodiments where 2 and 3 score predictions, respectively, can be entered on the card. The entry fee per game for multiple-score predictions is calculated in accordance with the general formula (I).

Hockey—Play-Offs & Stanley Cup

The professional hockey play-offs commence with a series of eight contests (four each from the Eastern and Western Conferences) where the survivor of each contest is the winner of four out of seven games. A game card representing a preferred embodiment is illustrated in FIG. 13. Since there are no ties in the playoffs, from four to seven games can be played, and a winning card requires correct predictions for all eight games. It will be understood that for each game, the winning team will have won four games and the losing team will have won from none to three games. In a preferred embodiment of the method, only a single prediction for each game is permitted.

The winning teams from the first phase of the play-off then compete in four new contests (two for each for the Eastern and Western Conferences), also for the best four out of seven games. Illustrated in FIG. 14 is a preferred embodiment of a typical round two game card. Participants can elect to enter predictions in from one to four of the contests. As in the regular season games, the conference semifinal play-off game predictions are of the total number of points scored in a game. In a preferred embodiment of the method of the invention, a winning participant correctly predicts not only the total score for the games played, but also the correct number of games. Thus, if a player enters predictions for seven games, but only six games are required to determine the best-of-four winner, the game card will not be a winner despite the accuracy of the predictions for the first six games.

The final two games for the Eastern and Western Conference Championship are also based upon winning four out of seven games and FIG. 15 illustrates the format of a preferred game card. The rules and method of play are as described above for the semifinal contests. In the Stanley Cup final, the Eastern and Western Conference champions compete for the best of four out of seven games. The game card of FIG. 16 illustrates a preferred embodiment, and the rules and method of play are as described above for the semifinals. It is to be noted that the play-offs differ from the scoring possibilities of the regular season inasmuch as a tie is not possible and the "zero" column is eliminated from the game cards starting with the semifinals. The entry of multiple predictions on semifinal and subsequent game cards are permitted, the price of the game card being determined in accordance with the description provided in connection with regular season game play.

Preferred Embodiment for Basketball

Shown in FIGS. 17A, 17B and 17C are game cards suitable for use in connection with basketball games. In the blank card illustrated in FIG. 17A, ten columns are positioned to the right of each of seven contests, each column designating a point range for predicting the total scoring during the respective games. The grid formed by the horizontal and vertical lines separating the games and defining the columns defines an array of boxes. In the format of FIG. 17A, the columns to the extreme left is headed "−180". A mark is placed in either of these columns if the participant predicts that the total of the scores of both teams will equal less than 180 points. A mark is placed in the right column if the participant predicts that the total of the scores of both teams will equal more than 220 points.

To participate in the basketball game of chance, the participant enters marks in the boxes adjacent to each game which correspond to the predicted total scores of the respective contests. In the basketball game of chance, prizes (of descending value) can be awarded to those participants choosing 7, 6 and 5 correct predictions.

As in the case of the baseball game card, FIGS. 17B and 17C represent embodiments where 2 and 3 score predictions, respectively, can be entered on the card. The entry fee per game for multiple-score predictions is increased in accordance with the general formula (I).

Basketball—Play-Offs & NBA Championship

The NBA play-offs commence with a first round of eight contests (four each for the Eastern and Western Conferences), the survivor winning three of five games. Illustrated in FIG. 18 is a preferred embodiment of a game card for use in entering predictions for the first round of the play-offs. The winning participant correctly predicts the total number of games won by each team in each of the eight contests, and only single entry predictions are permitted. The cost of a game card for the play-offs can be enhanced, e.g., $3.

The Eastern and Western Conference semifinals comprise four contests, the survivors being the teams to win four out of seven games. A preferred embodiment of the conference semifinal game card is illustrated in FIG. 19. The method of play is similar to that of the regular season games where the prediction is the total of the points scored by each team beginning at less than 180, and increasing incrementally (e.g., in 5 point increments) to the last column which is a score total exceeding 220 points. In a preferred embodiment of the invention, a winner is required to predict not only the correct range of the score totals, but also the total number of games actually played.

The NBA champion is determined in the final series between Eastern and Western Conference champions, based on the winner of four out of a maximum of seven games. Illustrated in FIG. 20 is a preferred embodiment of a game card for the conference championship and FIG. 21 illustrates a card for the final NBA championship game. Players have the option of entering a single prediction for each game, or two or more predictions for one or more games in the play-off series beginning with the conference semifinals. The cost for a game card containing multiple entries is calculated in accordance with the method described in connection with the regular season play.

As will be apparent, the various embodiments and methods can be combined as, for example, by game cards formatted for entry of score predictions for specified innings.

Determination and Notification of Winners

At a prescribed time, e.g., prior to the commencement of any of the identified sporting events, the acceptance of entries is terminated, e.g., by programming the computer to refuse further transactions and transmitting a message to that effect for display on the screens of remote terminals. After all of the identified sporting events have been completed, the score results are entered into the computer for processing and matching to identify any lottery entries which meet prize-winning requirements. The computer is programmed to indicate whether any prize-winning entries have been found, and if so, to generate a listing of the data entry transaction code for each. Prizes are then awarded following submission and verification of prize-winning receipts in accordance with well-established practices.

Although the method and apparatus for conducting a game of chance has been described with reference to specific examples and embodiments directed to a variety of sporting events, additional embodiments falling within the scope of this invention will be apparent to those of ordinary skill in the art.

I claim:

1. A game card for use by participants in the play of a game of chance conducted in conjunction with a plurality of regularly-scheduled sporting events between competing teams, the game card comprising:

a. a first information field identifying a plurality of principal team sporting events to be played by a specified date;

b. a second information field containing a plurality of pre-selected numerical values corresponding to the numerical value of the sum of the final scores of the competing teams for each event; and c. a plurality of blank delineated spaces aligned with the first and second information fields for receiving indicia entered by a participant to identify the participant's prediction of the numerical value of the sum of the final scores of the competing teams for each event.

2. The game card of claim 1 in which the first information field comprises a vertically aligned listing of the teams competing in the plurality of sporting events.

3. The game card of claim 2 in which the pre-selected numerical values of the second information field are horizontally arrayed.

4. The game card of claim 1 where the pre-selected numerical values in the second information field comprise sequential integers.

5. The game card of claim 4 where the pre-selected numerical values includes a high score card value that comprehends all final score value predictions that are greater than the highest sequential integer.

6. The game card of claim 1 where each of the pre-selected numerical values in the second information field comprises a specific range of final score values.

7. The game card of claim 6 where the pre-selected numerical values includes a high score value that comprehends all final score value predictions that are greater than the highest specific range of final score values.

8. The game card of claim 6 where the pre-selected numerical values includes a low score value that comprehends all final score value predictions that are lower than the lowest specific range of final score values.

9. The game card of claim 1 that further comprises a supplemental information field identifying one or more alternate sporting events to replace any principal sporting event that is not played or not played to completion.

10. The game card of claim 1 that is printed on paper or paperboard.

11. The game card of claim 10 in which the blank delineated spaces include printed indicia defining machine-readable symbols upon entry of a participant's prediction.

12. The game card of claim 10 that further comprises a machine-printed confirmation of a participant's entries on the completed card.

13. The game card of claim 12 where the confirmation comprises a unique data entry transaction code.

14. The game card of claim 1 that is published in the form of an electronic display on the monitor of a computer terminal.

15. The game card of claim 1 on which the indicia identifying the participant's prediction is entered in the blank delineated spaces using electronic control means.

16. The game card of claim 1 that further comprises indicia identifying the participant's predictions entered by a participant to complete the game card, where the completed game card is printed by a computer-directed printer.

17. The game card of claim 16 that further comprises a unique data entry transaction code.

18. The game card of claim 1 for use in championship-determining play, where the plurality of sporting events are between the same teams and the number of sporting events corresponds to the maximum number of games that can be played in accordance with the rules of the sport.

19. The game card of claim 18 where the sporting event is the world series of baseball and the first information field identifies nine baseball games.

20. The game card of claim 18 where the sporting event is the professional basketball championship and the first information field identifies seven basketball games.

21. The game card of claim 1 that further comprises blank delineated spaces for entries corresponding to the predicted numerical value of the sum of the scores of the competing teams for at least one intermediate period of play during the course of each event.

22. A game card for use by participants in the play of a game of chance conducted in conjunction with a scheduled sporting event between two competing teams, the game card comprising:

a. a first information field identifying a plurality of periods of play during the sporting event;

b. a second information field containing a plurality of scoring mode groups of pre-selected numerical values, each of said groups identifying a different scoring mode for the particular sporting event; and c. a plurality of blank delineated spaces aligned with the first and second information fields for receiving indicia entered by a participant to identify the participant's prediction of the numerical value of each of the modes of scoring by the competing teams during each of the periods of play of the game,whereby the numerical value of the sum of the scores of the competing teams during each of the periods of play are determined.

23. The game card of claim 22 which further comprises a blank delineated space for receiving indicia entered by a participant to identify the participant's prediction of the numerical value of the sum of the final scores of the competing teams.

24. The game card of claim 22 where each of the plurality of periods of play in the first information field further identifies each of the two competing teams.

25. The game card of claim 24 where the sporting event is football and the scoring mode groups comprising the second information field are touchdowns, conversions and field goals.

26. A game card for use by participants in the play of a game of chance conducted in conjunction with a plurality of regularly-scheduled sporting events between competing teams, the game card comprising:

a. a first information field identifying a plurality of principal team sporting events to be played by a specified time;

b. a second information filed containing a plurality of numerical values selected from the group consisting of the values corresponding to the numerical value of the sum of the final scores of the competing teams for each event, a subset of intermediate score values, the sum of which subset constitutes the sum of the final scores, and a combination the above score values; and c. a plurality of blank delineated spaces aligned with the first and second information fields for receiving indicia entered by a participant to identify the participant's prediction of the numerical value of the sum of the final scores and/or the subset of intermediate score values of the competing teams for each event.

27. The game card of claim 26 for use in conjunction with sporting events that comprise a plurality of time periods and the subset of intermediate score values corresponds to the plurality of time periods comprising the sporting event.

28. The game card of claim 27 where the sporting event is football and the time period is a quarter.

29. The game card of claim 27 where the sporting event is hockey and the time period is a half.

* * * * *